July 4, 1950 W. S. CLOUD 2,514,028
MEANS FOR CONTROLLING STRETCH IN STRETCH-WRAPPING
Filed Oct. 25, 1946
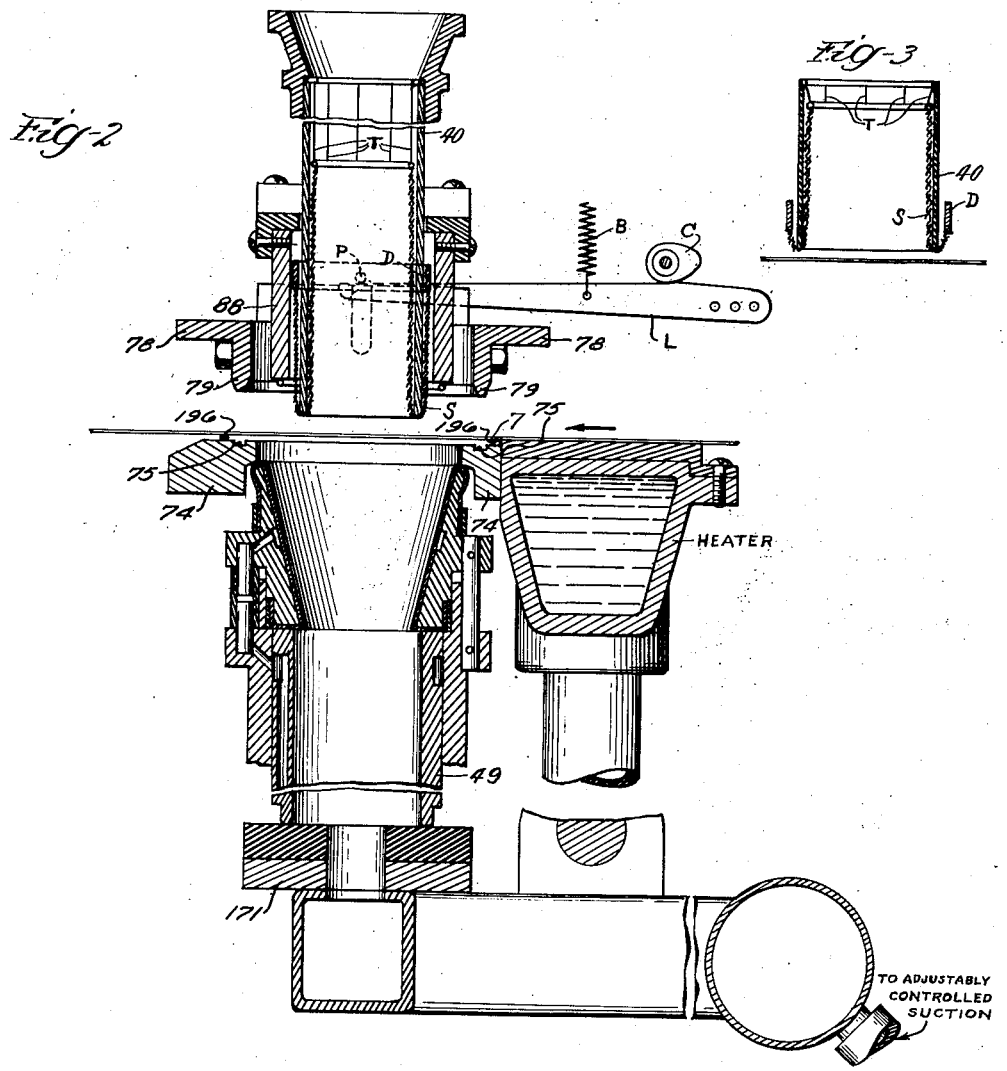
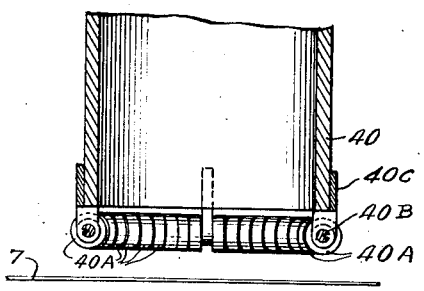
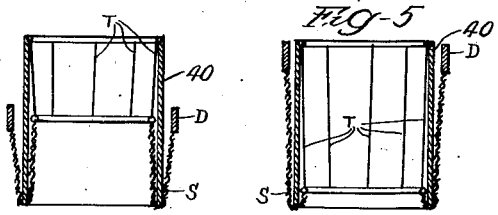
Inventor
William S. Cloud.
By:
Louis Robertson
Atty.

Patented July 4, 1950

2,514,028

UNITED STATES PATENT OFFICE 2,514,028

MEANS FOR CONTROLLING STRETCH IN STRETCH-WRAPPING

William S. Cloud, Wilmette, Ill.

Application October 25, 1946, Serial No. 705,767

4 Claims. (Cl. 18—19)

This invention relates to improvements in wrapping articles in thermoplastic material, and more particularly to an apparatus for encasing articles in which the distribution of the stretching of the thermoplastic material may be controlled.

I have developed an apparatus for wrapping candy and other items in a single sheet of thermoplastic material, such as that sold commercially under the trade name "Pliofilm," as disclosed and claimed in my Patent Number 2,403,482. There, a sheet of thermoplastic material is heated as it is advanced, to make it stretchable. The sheet is secured over a plate containing openings through which plungers pass. Pocket-like extensions are formed in the sheet by passing these plungers through the openings. These pockets are retained by the application of vacuum when the plungers are withdrawn. After articles have been deposited in these pockets, the articles and the portions of the sheet surrounding them are gripped and twisted to draw together above the article, the portions of the sheet forming the upper walls of the pockets, thus closing and sealing the pockets around the articles. The enclosed articles are then cut from the unused portion of the sheet.

Another apparatus is disclosed in Figures 2, 3 and 4 of Bulletin 369 of the University of Florida Agricultural Experiment Station, dated February 1942. There, a blank of thermoplastic material is clamped in a hollow frame and then heated to render it stretchable. The article to be wrapped is then thrust into the blank, forcing it through the opening in the frame to form a pocket-like extension. The article and the portion of the blank surrounding it are then gripped and twisted to close and seal the pocket-like extension around the article.

I have found that when heated thermoplastic material is secured over a plate or frame containing an opening and stretched in a direction perpendicular to its surface by forcing a plunger or the article to be wrapped through the opening, the friction created by the contact between the material and the plunger or article tends to prevent the portion of the material so contacted from stretching. Any stretching by this method will therefore reduce the thickness and strength of the material to a greater extent at the uncontacted portion than at the contacted portion.

If the material is drawn into the pocket by suction, I have determined that the central part of the film is likely to be excessively stretched.

It is an object of this invention to provide an apparatus whereby portions of a web of thermoplastic material may be deformed into pockets while controlling the relative thickness of the parts of said pockets.

With this and other objects in view, reference is made to the accompanying sheet of drawings for a better understanding of this invention. It is to be understood that minor changes may be made in the embodiment illustrated without departing from the scope of the invention, and while the stretchable material is sometimes described as thermoplastic material or as Pliofilm, the invention is not restricted to these particular forms of stretchable material.

In the drawings:

Figure 1 is a fragmentary diagrammatic perspective view of the lower end of a modification of the plunger 40, illustrated in Figures 12–20 of my Patent No. 2,403,482 and described therein more fully than above;

Figure 2 is a fragmentary diagrammatic sectional view of another modified form of the same plunger 40, together with some associated parts; and Figures 3–5 are diagrammatic views showing one example of the operation of the sleeve illustrated in Figure 2.

For purposes of brevity I do not repeat the figures of my Patent No. 2,403,482, but refer to them specifically and adopt them by reference wherever herein material.

As already indicated, I have disclosed and claimed in my Patent No. 2,403,482 a method and apparatus for forming in a single sheet of thermoplastic material pocket-like extensions, formed by forcing plungers 40 in a direction perpendicular to the surface of the sheet 7. With said apparatus portions of said extensions were of different thicknesses, with a tendency to produce undesired thicknesses in parts of the finished wrapper. According to the present invention, I avoid the undesired thicknesses by removing or controlling the friction which I have determined to be their cause. There may be various means of removing this friction.

Referring to Figure 1, the friction is removed by the anti-friction apparatus comprising freely rotating rollers of wheels 40—A, preferably containing ball or roller bearings, mounted upon a shaft or ring 40—B, which in turn is attached to plunger 40 by supports 40—C. The ring 40—B is given substantially the size and shape desired for the bottom of the pocket.

As plunger 40 is forced against the heated sheet 7 in the manner described in my Patent No. 2,403,482, wheels 40—A will contact the sheet. Being freely mounted, these wheels will revolve as plunger 40 is forced further into the sheet, thus eliminating substantially all of the friction between the plunger and the sheet. By this method and apparatus I can produce a pocket-like extension of substantially uniform thickness throughout.

The rollers 40—A may comprise standard bearing assemblies, the outer races engaging the film and the inner races engaging the ring 40—B. The rollers 40—A may be spaced apart slightly by bushings on ring 40—B engaging the inner races. If ring 40—B is formed as a square, the spacing bushings may not be necessary except perhaps at the corners.

I have illustrated in Figure 2 an alternative apparatus for eliminating or controlling this friction. A sleeve S of silk, spun glass, or some similar substance, encases the lower end of hollow plunger 40. The inside end of said sleeve is slidably mounted on plunger 40 and biased upwardly as by a series of springs or rubber bands T, which in turn are attached in any suitable manner to the inside of plunger 40. The outside end of sleeve S is attached to a draw ring D. Preferably, draw ring D is supported in a manner to be moved. For example, it may carry diametrically opposed pins P extending through slots in tubes 88 and resting on two arms of a bifurcated lever L. The lever L is controlled in one direction by suitable biasing means B and in the other direction by a suitable cam C. Cam C is driven in timed relation with the mechanism for operating plunger 40. By adjusting the mounting and size of said cam C, it is possible to move draw ring D either upward or downward any desired distance in timed relation with the stroke of plunger 40. Shifting the pivot point of lever L will also adjust the length of the stroke of draw ring D. By suitable adjusting biasing means B, with respect to the tension of springs T, cam C may be omitted. Of course, also pins P may be rigidly positioned.

As plunger 40 is forced against the heated sheet in the manner described in my Patent No. 2,403,482, a portion of sleeve S will contact the sheet. If draw ring D is so mounted as to maintain its height, as plunger 40 is forced downwardly and further into the sheet, it moves away from draw ring D and the sleeve S is pulled outwardly around the bottom of hollow plunger 40. Friction tends to prevent slippage between the sleeve and the sheet so that successive portions of the sleeve and the sheet will contact each other and the center portion of the film, underneath or in advance of plunger 40, will be stretched by the action of the sleeve. By this method and apparatus I can produce a pocket-like extension of substantially uniform thickness throughout. By mounting draw ring D so that its height will be varied in timed relation with the stroke of plunger 40, I can increase or decrease the sliding action of sleeve S and thus increase or decrease the stretching any desired amount. Figures 3 to 5 illustrate the inside-out action of the sleeve if the draw ring D remains stationary and the plunger 40 is moved downwardly with respect thereto.

On the raising of plunger 40, springs T draw the sleeve S back into the inside of said plunger the predetermined distance and the apparatus is readied for the next stroke.

By adjusting the apparatus shown in my Patent No. 2,403,482 so that vacuum plate 171 closes the bottom of each tube 49 (as seen in Figure 2 herein) prior to the plungers 40 making their stroke, sheet 7 may be drawn into tube 49 partially or entirely by vacuum. I have found that if the sheet is forced into the tube partially by vacuum and partially by the plunger, without friction controlling devices S or 40—A thereon, the resulting pocket-like extension may be formed with substantially uniform thickness throughout. If more vacuum than is required to obtain uniform thickness is applied, the center portion of the extension will be stretched more, and therefore be thinner than the portions adjacent the held edges; if less vacuum is applied, the center portion will be stretched less.

Thus, by adjusting the amount of vacuum, the different portions of the sheet can be stretched relatively any desired amount. Unless the sheet is to be drawn into the tube entirely by vacuum, an additional amount of vacuum may have to be applied to retain the pocket when the plunger is withdrawn. This may be done by increasing the action of the vacuum pump by hand or by conventional mechanical means, or by shifting from one vacuum source to another.

This application is in part a continuation of application, Serial No. 539,971, the disclosure of which is herein incorporated by reference: That application applies the principles of controlled stretch distribution to another type of machine.

From the foregoing it is seen that I have provided apparatus for controlling the distribution of stretch, or for avoiding an undesired distribution of stretch, in stretching plastic film for wrapping and like operations.

Although the law requires a full and exact description of at least one form of the invention, such as that above, it is, of course, the purpose of a patent to cover each new inventive concept therein no matter how it may later be disguised by variations in form or additions of further improvements; and the following claims are intended to accomplish this purpose by particularly pointing out the parts, improvements, or combinations in which the inventive concepts are found.

I claim:

1. Apparatus for forming in elastic sheet material a pocket, all portions of which are of substantially uniform thickness, including a ring, means for securing over the ring a strip of elastic sheet material, and a plunger adapted to extend said sheet material through said ring in pocket-like form, said plunger having freely rotating wheels mounted around its edges to contact said sheet material and substantially eliminate friction between them.

2. Apparatus for forming in elastic sheet material a pocket, all portions of which are of substantially uniform thickness, including a ring, means for securing over the ring a strip of elastic sheet material, a plunger adapted to extend said sheet material through said ring in pocket-like form, and an element associated with the plunger and movable relative thereto for substantially eliminating friction between said sheet material and the front of said plunger.

3. Apparatus for forming in elastic sheet material a pocket, the center and side portions of which are of predetermined relative thickness, including a ring, means for securing over the ring a strip of elastic sheet material, and stretching means comprising a hollow plunger adapted to extend said sheet material through said ring in pocket-like form to stretch the sheet material principally between the part contacted by said plunger and the secured edges, and including a sleeve encasing the end of said plunger and adapted to slide thereover in contact with said sheet material to vary the thickness of the center portion of said sheet material, underneath the plunger, and means for adjusting the amount of sliding of said sleeve.

4. Apparatus for forming a pocket in non-fibrous sheet material, including a ring, means for securing over the ring a strip of elastic sheet material, a plunger adapted to extend said sheet material through said ring in pocket-like form, and means carried by the plunger at its leading end having a surface movable with respect to the plunger for engaging the sheet material and moving with the sheet material relative to the plunger.

WILLIAM S. CLOUD.

REFERENCES CITED

The following references are of record in the file of this patent:

UNITED STATES PATENTS

| Number | Name | Date |
| --- | --- | --- |
| 673,982 | Hamet | May 14, 1901 |
| 1,481,866 | Heist | Jan. 29, 1924 |
| 2,251,477 | Wisman | Aug. 5, 1941 |
| 2,403,482 | Cloud | July 9, 1946 |

Disclaimer 2,514,028.—*William S. Cloud*, Wilmette, Ill. MEANS FOR CONTROLLING STRETCH IN STRETCH-WRAPPING. Patent dated July 4, 1950. Disclaimer filed Nov. 30, 1951, by the inventor.

Hereby enters this disclaimer to claims 2 and 4 of said patent.
[*Official Gazette December 25, 1951.*]